US012541962B2

(12) United States Patent
Luo et al.

(10) Patent No.: US 12,541,962 B2
(45) Date of Patent: Feb. 3, 2026

(54) TRAINING AUTOENCODERS FOR GENERATING LATENT REPRESENTATIONS

(71) Applicant: Intrinsic Innovation LLC, Mountain View, CA (US)

(72) Inventors: Jianlan Luo, Mountain View, CA (US); Stefan Schaal, Mountain View, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 616 days.

(21) Appl. No.: 17/945,918

(22) Filed: Sep. 15, 2022

(65) Prior Publication Data

US 2024/0096077 A1 Mar. 21, 2024

(51) Int. Cl.

| G06V 10/82 | (2022.01) |
|---|---|
| B25J 9/16 | (2006.01) |
| G06N 3/045 | (2023.01) |
| G06V 10/774 | (2022.01) |
| G06V 10/776 | (2022.01) |
| G06V 20/50 | (2022.01) |

(52) U.S. Cl.
CPC .............. *G06V 10/82* (2022.01); *B25J 9/161* (2013.01); *G06N 3/045* (2023.01); *G06V 10/774* (2022.01); *G06V 10/776* (2022.01); *G06V 20/50* (2022.01)

(58) Field of Classification Search
CPC ...... G06V 10/82; G06V 20/50; G06V 10/774; G06V 10/776; G06N 3/045; B25J 9/161
See application file for complete search history.

(56) References Cited

U.S. PATENT DOCUMENTS

| 10,839,267 | B2 | 11/2020 | Mehr et al. |
| 11,670,001 | B2 | 6/2023 | Mousavian et al. |
| 2019/0184561 | A1 | 6/2019 | Yip et al. |
| 2021/0316455 | A1* | 10/2021 | Bingham ............. G06N 3/0455 |
| 2022/0264331 | A1* | 8/2022 | Arnott .................... G06N 3/006 |
| 2023/0046520 | A1* | 2/2023 | Ye ........................... G06V 10/098 |
| 2023/0234232 | A1* | 7/2023 | Hayashi ................ B25J 13/084 |
| | | | 700/253 |

* cited by examiner

*Primary Examiner* — Wednel Cadeau
(74) *Attorney, Agent, or Firm* — Fish & Richardson P.C.

(57) ABSTRACT

Methods, systems, and apparatus, including computer programs encoded on computer storage media, for training an autoencoder. One of the methods includes receiving a pair of images, wherein a first image of the pair represents a first state of a working environment at a first time step earlier than that of a second image of the pair. A first and a second latent representation is generated respectively for the first and the second image by the autoencoder; A predicted reward for an action executed in the first state is generated by a reward prediction neural network. A predicted next latent representation for the first state and the action is generated by a dynamics prediction neural network. An overall loss is determined based on the predicted reward, the predicted next latent representation, and the second latent representation. Model parameters of the autoencoder are updated to reduce the overall loss.

20 Claims, 4 Drawing Sheets

TRAINING AUTOENCODERS FOR GENERATING LATENT REPRESENTATIONS

BACKGROUND

This specification relates to machine learning, and more particularly to training an autoencoder to generate latent representations for input images.

Robotic manipulation tasks often heavily rely on sensor data in order to complete the task. For example, a warehouse robot that moves boxes can be programmed to use camera data to pick up a box at the entrance of a warehouse, move it, and put it down in a target zone of the warehouse. For another example, a construction robot can be programmed to use camera data to pick up a beam and put it down onto a bridge deck.

A robotics system can deploy one or more machine learning models, e.g., neural networks, to perceive working environments when one or more robots in the system are instructed to perform particular tasks. Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of network parameters. In some implementations, a robotics system can implement reinforcement learning techniques to predict actions for robots in the system to achieve particular rewards when performing tasks.

One example of a generative machine learning model for extracting features (e.g., latent representations) from images capturing a working environment is a variational autoencoder. However, in real-world robotics environments, variational autoencoders are computationally intractable. This is particularly the case for real-time or near-real-time applications in which visual representations must be generated quickly.

SUMMARY

This specification describes techniques related to training an autoencoder to generate latent representations for input images. The input images generally capture different states of a working environment, within which one or more robots of a robotic system are instructed to manipulate one or more objects for performing particular tasks. A working environment is also referred to as an operating environment or a workcell. The training process includes optimizing an objective based on predicted latent representations generated by the autoencoder for processing training samples. The term "latent representations" generally refers to visual representations of an input image. In general, an autoencoder can encode or map input image pixels from a higher dimensional domain to a lower dimensional domain. The lower dimensional domain is also referred to as a feature space, a latent space, or an embedding space. A latent representation is also referred to as a latent feature or a latent embedding. The latent representation can include one or more data structures capturing features of an image. For example, the latent representation can be stored in a vector form, a matrix form, or can be constructed as a look-up table. For simplicity, the following specification uses "latent representations" for features or embeddings generated by an autoencoder for processing various input images.

The trained autoencoder can further generate latent representations for input images and based on the generated latent representations, one or more reinforcement learning models or control policies can be trained for instructing robots in a robotic system to perform respective actions at respective states (e.g., robotic states or environment states) or different time steps.

One aspect of the described techniques relates to a method for training an autoencoder to generate latent representations for working environment states captured in images. The training process includes processing a stream of image pairs as training samples. Each image pair of the image pairs include a first image of the pair capturing a first state of a working environment at a first time step, and a second image of the pair capturing a second state of the working environment at a second time step, which is at a time step later than the first time step. By using the autoencoder to process the first and the second images respectively, the system can generate a first latent representation for the first state of the working environment and a second latent representation for the second state of the working environment. The system further predicts a reward for an action to be executed in the first state using a reward prediction neural network, and a next latent embedding for the working environment after the action is executed using a dynamics prediction neural network. Based on the predicted reward, the predicted next latent embedding, and the second latent embedding, the system can determine an overall loss for the image pair. The system can update model parameters of the autoencoder by reducing the overall loss.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

The subject matter described in this specification can resolve the above-noted difficulties and can be implemented in various embodiments and may result in one or more of the following advantages. A system performing the described techniques can train an autoencoder more efficiently compared to conventional techniques for training an autoencoder. First, the training samples for training the autoencoder include a sequence of image pairs. Each image pair includes two images capturing a common working environment at different time steps (e.g., the first image of the pair is taken at a first time step, and the second image of the image pair is taken at a second time step later then the first time step). The system can update model parameters based on predicted representations for the two pairs of images, different from comparing a reconstructed image using the autoencoder and the input image. Accordingly, the training process generally relates to minimizing an overall loss that does not include a conventional reconstruction loss. More specifically, the overall loss is based at least on a latent representation prediction loss determined by comparing the respective predicted latent representations for the image pair at two different time steps. The overall loss is also based on a reward prediction loss determined by comparing a reference reward and a predicted reward for a robotic system, if one or more robots execute particular actions at a particular state of a working environment captured in one of the two images. Given the specially-designed loss, the trained autoencoder can generate latent representations with a boosted accuracy. Furthermore, because the to-be-trained autoencoder includes only the encoder stack (e.g., network layers configured to predict latent representations for inputs), and does not include the decoder stacks (e.g., network layers configured to construct input images based on the predicted representations), the autoencoder does not need to reconstruct input training images during the training process, which further avoids overfitting and reduces the cost of computation resources and the time for training the autoencoder.

In addition, the system is robust to background noises and outlier input data by using an autoencoder to predict latent representations for input images. In general, the latent representations can represent visual features at different levels of an input image, and they are robust to the presence of noise and can be generalized for different environments/ backgrounds. In addition, the system trains the autoencoder using training samples (e.g., image pairs) collected by sensors, which generally include background information and noises in the working environment. Given that (i) the training process considers the backgrounds and noises, and (ii) the loss function is based on the predicted latent representations, which are generally robust to noises and features at different levels, the techniques further improve the efficiency and robustness of the training of the autoencoder.

Furthermore, the described techniques can further facilitate the training process and improve the training accuracy by dynamically incorporating the autoencoder with a reinforcement learning model for controlling a robotic system. For example, on the one hand, a system implementing the described techniques can use actions determined by a pre-trained reinforcement learning model with fixed model parameters to train the autoencoder. On the other hand, once the autoencoder has been trained, the system can generate latent representations for images capturing different states of a working environment using the trained autoencoder, and feed the latent representations as input for training the reinforcement learning model. In some implementations, the system can further fine-tune model parameters of the trained autoencoder when training the reinforcement model. In some implementations, the system can also fine-tune one or more machine learning models when training the autoencoder.

Moreover, the described techniques can reshape a sparse reward for an action executed by a robot in a robotic system at a particular state into a dense one. The system can enhance the accuracy of determining an overall using the dense reward, which eventually improves the accuracy of trained autoencoder.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The described techniques generally relate to training a machine learning model to learn how to generate latent representations (also referred to as latent variables, features, or embeddings) from input data. More specifically, the training techniques can be applied to different machine learning models including both discriminative models (e.g., classifiers) and generative models (e.g., some regression models). For simplicity, the training techniques in this specification are primarily described in connection with an autoencoder, particularly, a variational autoencoder.

Conventional autoencoders suffer from a few technical challenges. For example, a conventional autoencoder focuses on overall features of input data at the expense of lacking granularity, i.e., being deficient in discerning interesting local features. More specifically, a conventional autoencoder can include a general encoder stack and a general decoder stack. A general encoder stack can include multiple network layers and is configured to generate latent representations for input data, and a general decoder stack can include multiple network layers and is configured to reconstruct the input data based on the latent representations. Given that, training a general autoencoder includes training both the encoder and the decoder, and an objective used in the training process inevitably weighs errors in the reconstruction step. This way, a trained autoencoder would focus too much on the overall features of input data, but might render unsatisfactorily the ability to abstract local features in the input data (e.g., local features might be shifted by background distractions). In addition, a conventional autoencoder might not be able to capture changes in a working environment, or capture features in a scene that the autoencoder has never seen before (e.g., not captured in any training examples).

The described techniques can solve at least the above-noted problems. First, the described training techniques need not spend time training a decoder. Alternatively, an autoencoder for training does not rely on a decoder, and the objective function for training is based on the predicted latent representations generated by the encoder alone. This way, the described techniques can extract local features that are interesting to the working environment and still be capable of generalizing the overall features of the input data. Furthermore, the training samples used in the training data are in time series and in the form of image pairs. Each image pair includes two images capturing a common working environment at different states at different time steps. In this way, the trained autoencoder can satisfactorily apprehend working environment changes in the predicted latent representations. Such latent representations can be further used for training a reinforcement learning algorithm configured to generate actions for robots in the working environment to execute.

Figure 1:
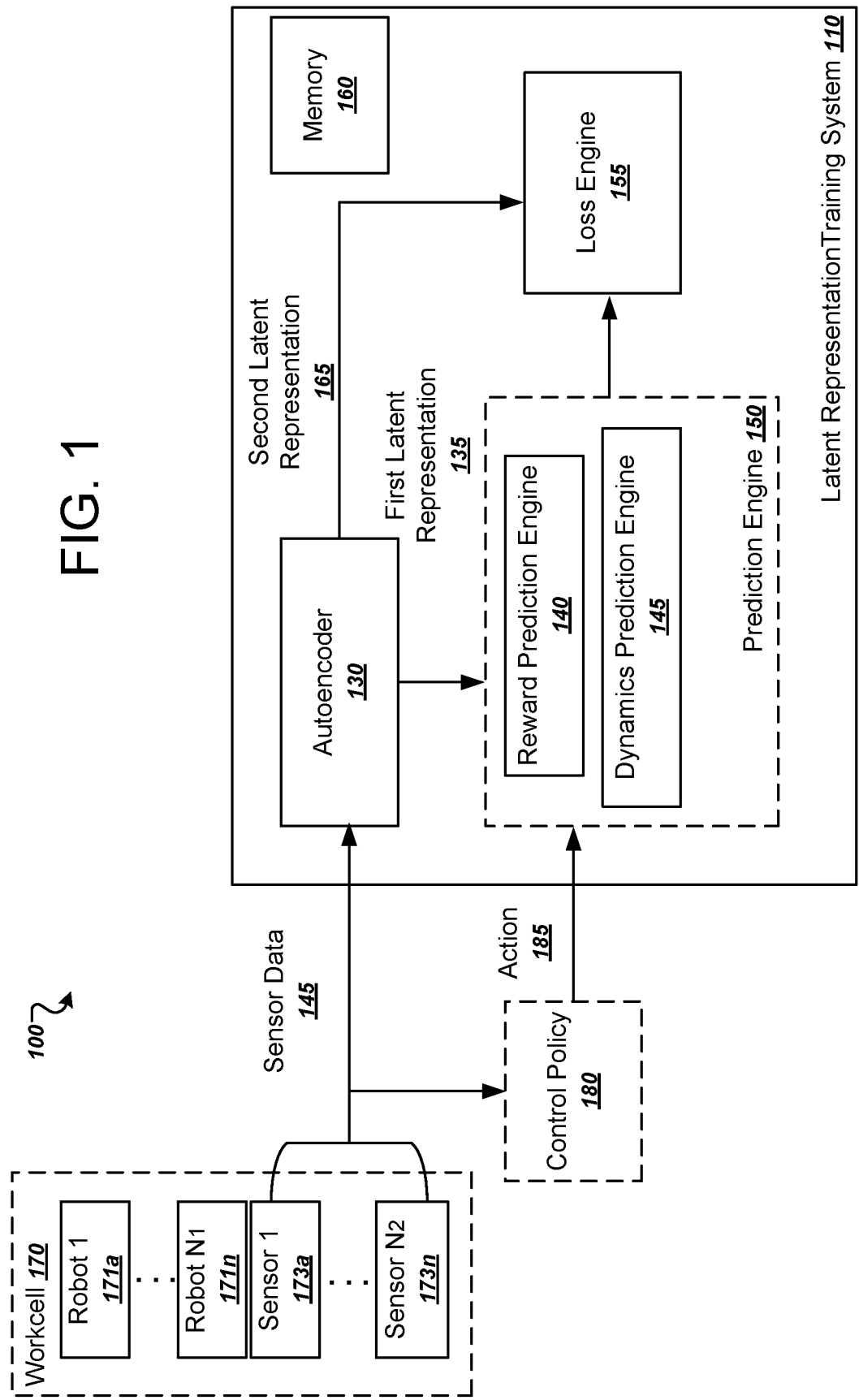
FIG. 1 illustrates an example system for training an autoencoder configured to generate latent representations for input images.

FIG. 1 illustrates an example system 100 for training an autoencoder 130 configured to generate latent representation 135 for input images. The example system 100 is a system that can be implemented on one or more computers in one or more locations, in which systems, components, and techniques described below can be implemented. Some of the components of the system 100 can be implemented as computer programs configured to run on one or more computers. The latent representation training system 110 can include any suitable engines or algorithms configured to train the autoencoder 130 according to a particular training objective. It should be appreciated that components included in dashed boxes such as workcell 170, control policy 180, and the predicted engine 150 can be external to the system 100.

In FIG. 1, a robot workcell 170 is used as an example of a physical working environment or a physical operating environment. The techniques described in this specification can also be used to train an autoencoder using training data collected for robots in other operating environments that are not workcells. In addition, the techniques described in this specification can also be used to train an autoencoder using training data collected for robots in virtual operating environments, e.g., as simulated by engines or processors that are included in the system 100 or external to the system 100. For simplicity, the term "workcell" generally refers to the term "working environment" in the following description.

In general, the latent representation training system 110 is configured to receive input data or training data for training an autoencoder 130. The training data generally includes sensor data 145 collected through sensors 171a-n in the workcell 170. The sensor data 145 includes at least images capturing the multiple robots 171a-n and multiple objects to be manipulated by the multiple robots 171a-n to perform particular tasks. The images are generally taken and labeled with a time step or a time point when they are taken. In some implementations, the sensor data 145 include a stream of images captured by sensors 173a-n. Each image captures the workcell 170 at a particular time step. The workcell 170 is generally at a particular state for a time step when the workcell is captured by a particular image. A workcell state (also referred to as a working environment state) includes states for all components in the workcell. For example, a workcell state can include poses of robots of interest in the workcell, and poses of objects of interest in the workcell. The robots of interest generally include robots, robotic joints, arms, or end effectors. The objects can include various components to be relocated or assembled. One example object can be electronic components stored in different trays and are to be assembled by robots, optionally through a fixture.

As described above, the system 100 does not necessarily include the workcell 170 and the sensor data 145 does not necessarily come from sensors 173a-n in the workcell 170. Instead, the sensor data 145 capturing a working environment at different time steps can be stored and provided from a memory unit external to the system 100.

The latent representation training system 110 can receive the sensor data 145 and generate multiple image pairs for training the autoencoder 130. In some implementations, the image pairs are included in the sensor data 145. Each image pair of the multiple image pairs include a first image capturing the workcell 170 at a first time step, and a second image capturing the same workcell 170 at a second time step. Without losing generosity, one can assume the first time step is at a time point earlier than the second time step, or vice versa. The workcell 170 is at a first workcell state in the first image, and at a second workcell state in the second image. The first state and the second state are generally different, but in some situations, they can be identical.

The latent representation training system 100 can train the autoencoder 130 based on the training samples, e.g., images pairs capturing a workcell at different time steps. More specifically, for each image pair of a batch of image pairs, the latent representation training system 110 can process the first image of the image pair using the autoencoder 130 to generate a first latent representation. The first latent representation generally captures visual features of the first image that represent a first workcell state at the first time step. The latent representation training system 110 can further process the second image of the image pair using the autoencoder 130 to generate a second latent representation. The second latent representation generally captures visual features of the second image that represent a second workcell state at the second time step. Assuming the first time step is at a time point earlier than the second time step, the latent representation training system 100 provides the first latent representation 135 to the prediction engine 150 and provides the second latent representation 165 to the loss engine 155 included in the latent representation training system 110.

Some generative models, e.g., a variational autoencoder, used in unsupervised learning (training with unlabeled training samples) are trained to approximate the marginal distribution of a particular variable by maximizing a variational lower bound for the marginal distribution. One example expression of the marginal distribution is described as follows:

$$p_\theta(x) = \int p_\theta(z) p_\theta(x|z) dz, \quad \text{Equation (1)}$$

where the variable z is the latent variable over which the integration is performed, and the variable x generally includes the input images for a VAE, and the variable z generally represents visual features of input images x and is also referred to as the "latent" representation because they are not explicitly measured or obtained from the physical environment. The distribution $p_\theta(x)$ is accordingly intractable due to the marginalization of variable z. Because the distribution $p_\theta(x)$ is intractable, the posterior distribution of the latent representation z, $p_\theta(z|x)$, is also intractable according the Bayesian statistics as follows:

$$p_\theta(z|x) = p_\theta(x|z) p_\theta(z) / p_\theta(x), \quad \text{Equation (2)}$$

One way to determine the marginalized distribution of x is to approximate the distribution based on a lower bound, which can be expressed as:

$$\log(p_\theta(x)) \geq L(x,\theta,\phi) = E_z(\log(p_\theta(x|z))) - D_{KL}(q_\theta(z|x)\|p_\theta(z)) \quad \text{Equation (3)}$$

where the term L(x, θ, φ) generally refers to as the variational lower bound or the evidence lower abound of $\log(p_\theta(x))$, and the term $q_\theta(z|x)$ is a distribution to approximate the posterior distribution of the latent representations, i.e., $p_\theta(z|x)$. The first term on the right hand side, $E_z(\log(p_\theta(x|z)))$, refers to as the reconstruction loss, and the second term on the right hand side, $D_{KL}(q_\theta(z|x)\|p_\theta(z))$ refers to the Kullback-Leibler (KL) divergence, which is a type of statistical distance measuring how one probability distribution is different from another. The objective in training a conventional VAE is to minimize the KL divergence between the distribution $q_\theta(z|x)$ and the posterior distribution $p_\theta(z|x)$. Or equivalently, the objective is to maximize the lower bound L(x, θ, φ). Once the posterior distribution is determined, the encoder stack of a VAE can sample latent representations z from the posterior distribution given particular input images x. It should be noted that, according to the described techniques in the specification, the objective for training a VAE including only the encoder stack is different from the above-described conventional objective. More details related to the objective or the loss function are described in connection with FIG. 3.

Referring back to FIG. 1, the prediction engine 150 can receive the first latent representation 135 for the first image of an image pair and can receive an action 185 to be executed by one or more robots in the workcell at the first state. The action 185 can be determined by a control policy 180 for the first image. The control policy 180 can be determined or learned from a reinforcement learning model. The control policy 180 can be external to the system 100. The action 185 includes one or more instructions specifying how one or more robots in the workcell 170 should move or manipulate objects. As described above, the control policy 180 or a reinforcement learning model including a control policy does not need to be included in the system 100 or the latent representation training system 110. Instead, in some implementations, the latent representation training system 110 can include an interface to receive action 185 predicted for one or more robots in the workcell 170 at a particular workcell state.

After one or more robots perform the action 185, the system 100 can obtain some reward for performing the action at the first time step. The reward can represent a quantitative measure of how effective the action 185 is for the robotic system to achieve a particular goal when performing a particular task. The reward can be one or more values in various data structures, e.g., vector or tensor structures, and can be represented in a sparse form or a dense form. For sparse rewards, the described techniques can reshape the data structure for the rewards to generate dense form rewards. The details of reshaping sparse rewards are described in connection with FIG. 3.

In addition, a workcell state for a workcell also translates from a first state to a next state due to the motion of one or more robots, or corresponding objects, or both, after the one or more robots perform the action 185. It should be appreciated that the next state of the workcell should correspond to the second workcell state captured in the second image of the image pair. Theoretically, if the autoencoder 130 is accurately trained and other prediction processes do not include any error, the predicted next latent representation for the first latent representation 135 should be substantially the same as the second latent representation 165 for the second image. As described above, the prediction engine 150 is not necessarily included in the system 100 or the latent representation training system 110. Instead, the prediction engine 150 can be external to the system 100 and in these implementations, the latent representation training system 100 can include an interface for receiving the first latent representation 135 from the autoencoder and providing the predicted rewards and predicted next latent representation to the loss engine 155.

To determine the reward for the action 185, and corresponding next latent representation for the next state to which the workcell transforms after one or more of robots 171a-n in the workcell 170 perform the action 185, the latent representation training system 110 can includes a prediction engine 150 configured to generate the reward and the next latent representation based on the first latent representation 135 and the action 185. The prediction engine 150 can include a reward prediction engine 140 configured to predict a reward for the action 185 based on the first latent representation 135 and the action 185. In some implementations, the reward prediction engine 140 can include a reward prediction neural network. The prediction engine 150 can further include a dynamics prediction engine 145 configured to predict the next latent representation for the first image based on the first latent representation 135 after the action 185 is performed. In some implementations, the dynamics prediction engine 145 can include a dynamics prediction neural network. The details of the processing for generating the reward and the next latent representation are described in connection with FIG. 3.

To train the autoencoder, the system 100 can optimize an objective for each image pair of multiple image pairs. The loss engine 155 included in the latent representation training system 110 can identify an objective. The objective is generally task-specific. For example, the loss engine 155 can determine a first objective for training an autoencoder for robots to perform a pick and place task, and determine a different objective for training an autoencoder for robots to perform a welding task. One example objective can be minimizing an overall loss based on the predicted output and particular references. The overall loss or the corresponding loss function defining the overall loss can also be task specific. One example over loss can include a L2 norm for performing a pick and place task. In some implementations, the loss engine 155 does not necessarily determine an objective or a loss function. Instead, the loss engine 155 receives data representing an objective or a loss function that are determined for particular tasks by other computer components or processors internal or external to the system 100.

One example objective can be minimizing an overall loss based on the received second latent representation 165, the predicted reward for the action 185, and the predicted next latent representation for the first latent representation 135. The overall loss function can include a reward prediction loss function and a latent representation prediction loss. The reward prediction loss function measures a difference between the predicted reward for the action 185 using the reward prediction engine 140 and a reference reward for the action 185. The reference reward can be determined after one or more robots perform the action 185 in the real first state for the workcell 170. The reference reward can be stored in the memory 160 in the latent representation training system 110.

It should be appreciated that the reward is defined according to a particular type of task the robots in the working environment perform, and the loss function and the corresponding objective for the training is also task-specific. For reinforcement learning, the reward can be defined at different levels, e.g., a final reward for achieving a final goal, or a few sub-goal rewards for achieving subgoals of the final goal, and the reward can further include an instant reward at a local time step after an action is performed, and an accumulated reward till the end of a reward episode. Accordingly, the reward can be customized for different types of robotic tasks and how a goal and corresponding sub-goals are defined for the robotic tasks.

The latent representation prediction loss function measures a difference between the second latent representation 165 for the second image of the image pair and the predicted next latent representation generated using the dynamics prediction engine 145 for the first latent representation 135 and the action 185. For example, the measurement used in the latent representation prediction loss function can include a KL divergence between the predicted next latent representation and the second latent representation 165, and the measurement used in the reward prediction loss function can include another KL divergence between the predicted reward for the action 185 given the first latent representation 135 and the reference reward for the action 185 executed in the first workcell state. The details of the above-noted loss functions and the two KL divergences are described in connection with FIG. 3.

To train the autoencoder 130, the loss engine 155 can reduce the above-noted overall loss for each image pair of all image pairs in the training samples. By repeatedly performing the above-described steps for processing each image pair in the training samples and reducing the overall loss for each image pair, the latent representation training system 110 can train the autoencoder by suitable backpropagation techniques (e.g., stochastic gradient descent). One technique for training a VAE using backward propagation is to re-parameterize the probability distribution of the latent representation to a standard normal distribution, so that the VAE layers become differentiable. The training process can include various techniques to optimize or facilitate the convergence. Example techniques include sorts of optimizations such as Adam optimizers for the stochastic gradient descent.

The trained autoencoder 130 is configured to process an input image at a particular time step and generate a latent representation for the input image. The generated latent representation can be used for training a control policy or a reinforcement learning model to predict actions for robots in the workcell state captured in the input image. In some implementations, the model parameters of the trained autoencoder 130 can further be fine-tuned when training the reinforcement learning model.

In some implementations, the system can generate training samples for training the autoencoder 130. For example, the system 100 can generate an image pair by manipulating or moving one or more robots 171*a-n* in the workcell 170 from first poses at a first time step to second poses at a second time step, e.g., accordingly to a manipulation sequence. The sensors generally capture the workcell 170 at the first time step with the one or more robots 171*a-n* at the first poses and capture the workcell 170 at the second time step with the one or more robots 171*a-n* at the second poses. The manipulation of robots generally includes moving a robot from a first location to a second location, tweaking a robot from at one or more joints in one or more degrees of freedom (e.g., rotate a first joint along a first rotational axis). Alternatively or in addition, a user can manipulate one or more robots and, optionally, manipulate one or more objects in the workcell 170 to create different workcell states for image pairs. Given that, the first state of the workcell 170 at the first time step is generally different from the second state of the workcell 170 at the second time step. However, in some situations, the first state can be the same as the second state, e.g., when the robots are running in a periodic manner and the components are manipulated in a similar manner or are not moved or manipulated at all.

The observations 145 can include raw sensor data collected by sensors 173*a-n* and/or robots 171*a-n* in the workcell 170, and/or processed sensor data that are processed by the robot interface subsystem 160. The raw data collected by sensors and/or robots in the workcell 170 can include poses of the robots or robotic joints, arms, or end effectors, positions and dimensions of a general fixture located in the workcell 170, locations and dimensions of trays that store components to be assembled by one or more robots following a particular motion plan 155, or poses of components in the workcell 170. The processed data can be generated based on raw data by filtering erred or outlier raw data or manipulating the raw data. For example, the processed data can include derived data based on the raw data, such as velocity or acceleration of a robotic end effector, mismatches when one or more components are deposited on a general fixture, misplacements or errors when assembling a component into a product (e.g., a PCB). The robot interface subsystem 160 can be configured and deployed on processors that are external to the workcell 170 through wired or wireless communications. Alternatively, the robot interface subsystem 160 can be configured and deployed on one or more sensors and/or robots in the workcell 170.

Figure 2A:
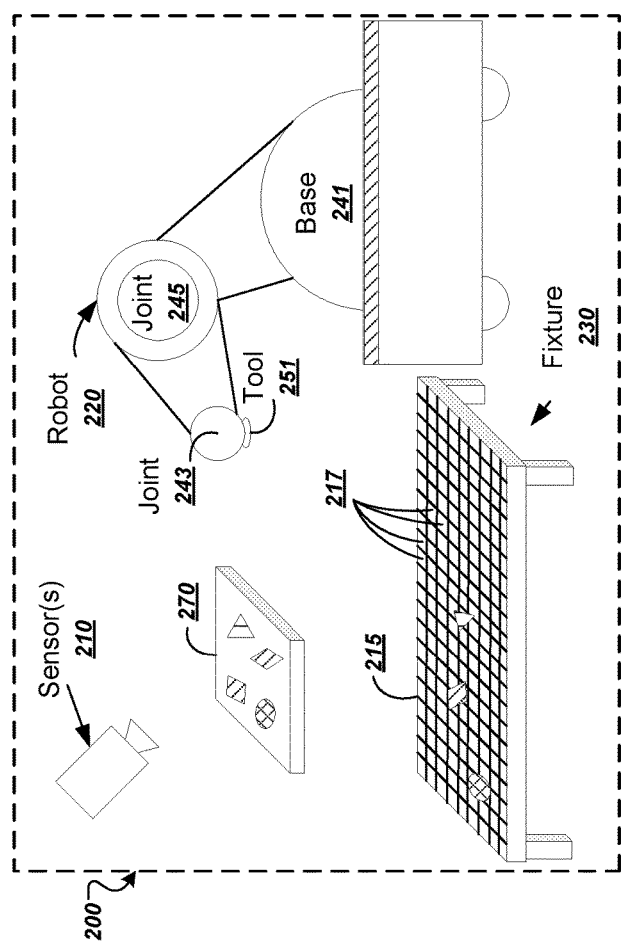
FIGS. 2A and 2B illustrate a schematic image pair capturing different states of a working environment at different time steps.
Figure 2B:
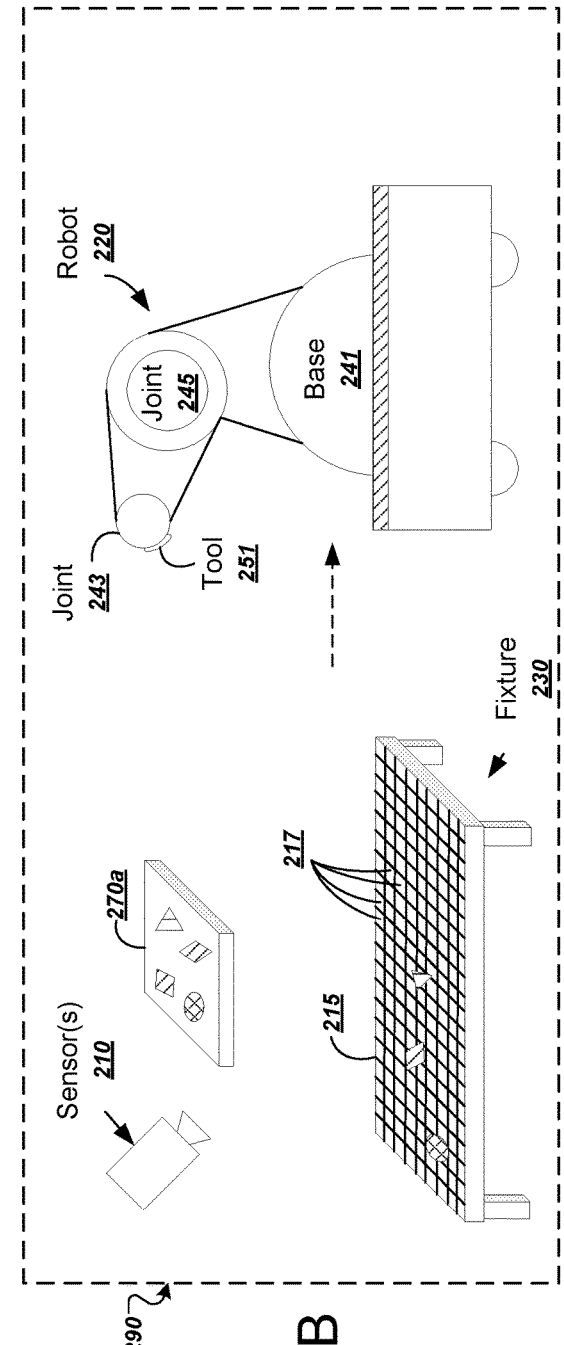

FIGS. 2A and 2B illustrate a schematic image pair 200 and 290 capturing different states of a working environment at different time steps. The schematic image pairs 200 and 290 are included in sensor data, e.g., the sensor data 145 of FIG. 1. The schematic image pairs 200 and 290 were taken at different time steps by one or more sensors in the working environment. For example, the workcell 170 of FIG. 1 is an example working environment for one or more robots captured in the image pair 200 and 290, and the one or more sensors 173*a-n* are example sensors. The image pairs can be two images taken when a robotic system 100 is performing a particular task. The particular task, for example, can be assembling different components on an electronic board using a general fixture in a workcell.

Assuming that image 200 is the first image of the image pair and captures the workcell 170 at a first state at a first time step, and that image 290 is the second image of the image pair and captures the workcell 170 at a second state at a second time step. The first time step is at a time point earlier than the second time step. The first workcell state is different from the second workcell state because one or more robots, or objectives, or both are not located at the same locations with the same poses.

As shown in the first image 200, the workcell 170 can include one or more robots, e.g., a first robot 220. The first robot 220 can include a base, moveable components connected by one or more joints, and one or more end effectors (or, equivalently, tools). As shown in FIGS. 2A and 2B, the first robot 220 can include a base 241, movable components (e.g., robotic arms) that are connected by joints 243 and 245, and a tool 251. The first robot 220 can perform one or more actions predetermined for the robot by following a sequence of motions. One action for the first robot can include a translation, a rotation, or any other suitable action.

The workcell can include one or more sensors 210 to capture the sensor data, e.g., images representing the workcell and its components. The one or more sensors 210 can be generally fixed relative to a reference coordinate. Alternatively, one or more sensors 210 can be located by one or more robots so that they can change poses with the robots.

The workcell 170 can further include one or more trays for storing different components to be manipulated by robots. As shown in FIG. 2A, the tray 270 can include multiple components of various types. In some implementations, the tray 270 can include multiple components of a common type. Note that different types of components for a particular robotic task are illustrated in different shapes and shades in FIGS. 2A and 2B. For example, the task can be related to pick and place, and the components can include different types for different assembly processes. For example, for assembling a PCB, the components can include at least one or more of a power switch, a power indicator, a delay range selector, an adapter, an input and/or output switch, an audio and/or video input/output jack, an LED bulb, a motor, a buzzer, a battery, a diode, a transistor PNP or NPN, an integrated circuit, a relay, a capacitor, an inductor, or any other suitable components for a PC board. The system can customize an objective for training an autoencoder specific to the pick and place task illustrated in FIGS. 2A and 2B, similar to those described above. In some implementations, the system can further determine a type for a task based on the attributes of one or more robots and components in a working environment, and customize an objective for training the autoencoder specific to the determined task type.

As discussed above, the system can customize an objective

The workcell 170 can further include an intermediate platform for relocating the different components or a platform for assembling the different components. An example intermediate platform can include a fixture 230 to receive different components. The fixture 210 can include a mesh surface defining one or more openings 217 to receive one or more components, so that when the components are received in the corresponding openings 217, the components are posed in particular orientations.

The workcell 170 captured in the first image 200 is at the first workcell state defined by respective locations and poses of the robot 220 and its parts (e.g., joints 243 and 245, a base 241, and a tool 251), and one or more components in the workcell 170.

Referring to the second image 290 of the image pair, the first robot is moving away from the fixture 230. The joints 243 and 245 are also rotating so that robotic arms are in different poses than those captured in the first image 200. The tool or the end effector 251 is oriented in a different direction than that in the first image 200. Accordingly, the workcell 170 is at the second workcell state, which is different from the first workcell state because at least the first robot 220 and its corresponding parts are at different locations, or having different poses, or both.

One should note that the image pair 200 and 290 are only for the purpose of illustration and the image pairs can include two images capturing a different workcell having robots in different numbers with different configurations and poses, components of various types at different locations, and sensors of different numbers with different orientations. In addition, the first image 200 is not necessarily taken at a time step earlier than that for the second image 290. Rather, the first image 200 can be taken at a time later than the second image 290. The time interval between the first image 200 and the second 290 can be any suitable time window, e.g., from a few seconds to a few hours.

Figure 3:
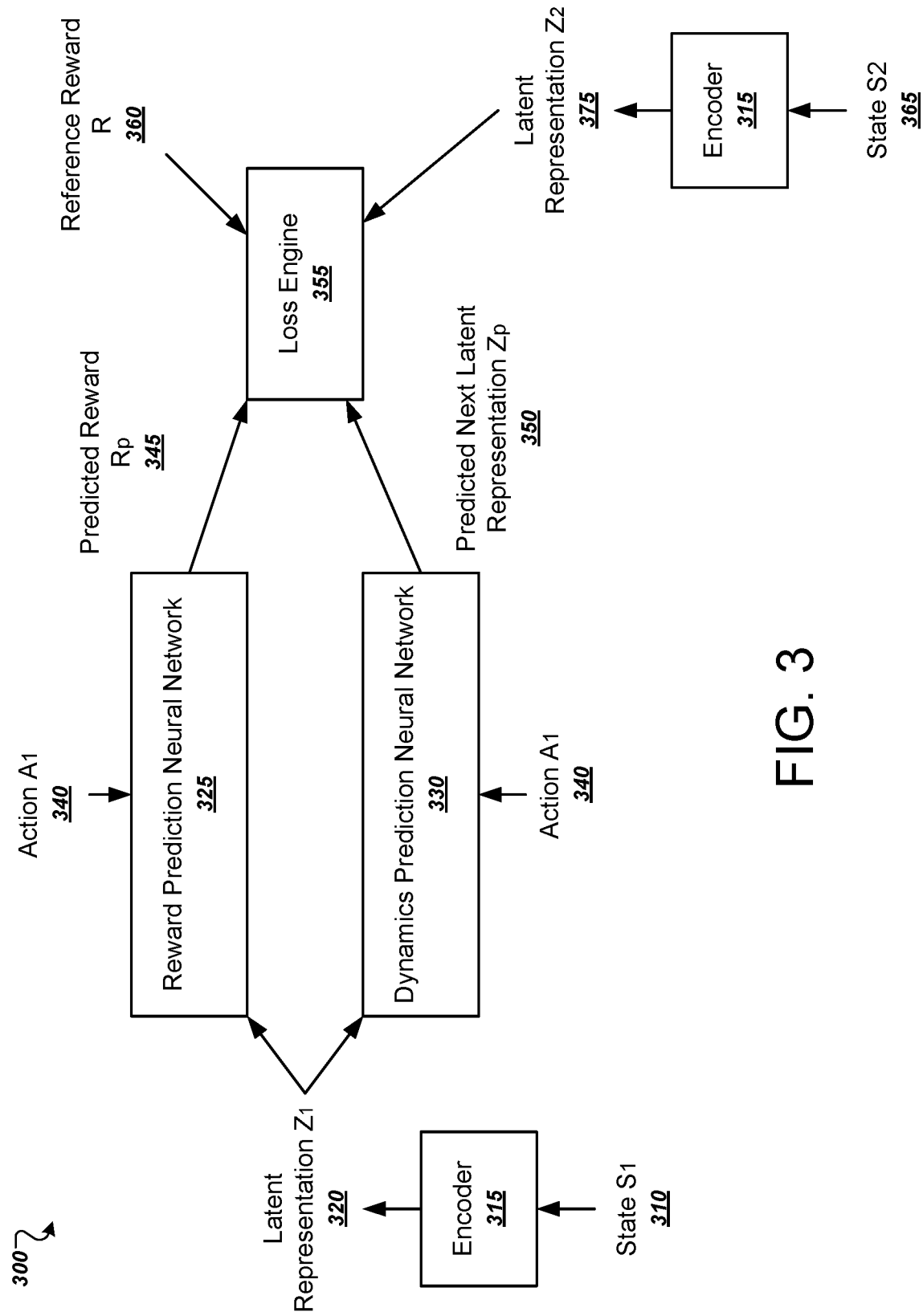
FIG. 3 illustrates a schematic diagram for training an autoencoder.

FIG. 3 illustrates a schematic diagram 300 for training an autoencoder. For convenience, the diagram generally relates to system 100 of FIG. 1 and the process associated with the diagram can be performed by system 100 of FIG. 1.

As shown in FIG. 3, the system first receives a state S1 (310) as an input for the encoder 315 and a state S2 (365) as another input for the encoder 315. In general, the state S1 (310) corresponds to the first working environment state of a working environment (e.g., workcell 170) captured in a first image of an image pair, and the state S2 (365) corresponds to the second working environment state of the working environment in a second image of the image pair. The first image is taken at a time point earlier than that of the second image. Since the states S1 (310) and S2 (365) are inherently and implicitly presented in the image pairs, the input for the encoder 315 can be generalized as input images, similar to those described above. In addition, the encoder 315 is equivalent to the autoencoder 130 of FIG. 1. In the specification, the term "encoder" generally refers to an autoencoder having an encoder stack and not having a decoder stack.

The encoder 315 is configured to process the state S1 (310) to generate a first latent representation Z1 (320) for the first image of an image pair, and process the state S2 (365) to generate a second latent representation Z2 (375) for the second image of the image pair. As described above, the encoder 315 is a generative model, which is configured to generate latent representation by sampling from a posterior distribution of the latent representation z. Accordingly, the first latent representation (365) is sampled from a first distribution on condition of the first image, and the second latent representation (375) is sampled from a second distribution on condition of the second image.

In some implementations, the system can assume a particular distribution form for sampling in the latent representation space. For example, the distribution can be a normal distribution, a Poisson distribution, or other suitable distribution. For situations where the latent representation space is assumed to obey a normal distribution, training the encoder 315 generally relates to determining parameters of the normal distribution, e.g., the mean and the standard deviation. Accordingly, the first latent representation (365) is sampled from a first normal distribution with a first mean and a first standard deviation determined for the first image, and the second latent representation (375) is sampled from a second normal distribution with a second mean and a second standard deviation for the second image.

Referring to the first latent representation Z1 (320), the system can provide the first latent representation Z1 (320) as an input to the reward prediction neural network 325. In addition, the system can provide the first latent representation Z1 (320) as an input to the dynamics prediction neural network 330. Note the reward prediction neural network 325 is equivalent to or included in the reward prediction engine 140 of FIG. 1, and the dynamics prediction neural network 330 is equivalent to or included in the dynamics prediction engine 145 of FIG. 1. Both the reward prediction neural network 325 and the dynamics prediction neural network 330 are pre-trained with accuracies above a respective threshold. In some implementations, the reward prediction neural network 325 and the dynamics prediction neural network 330 can be pre-trained with the training of the autoencoder.

The reward prediction neural network 325 is configured to predict a reward Rp 345 for an action A1 (340) performed by one or more robots in the working environment at a state represented by the latent representation Z1 (320). Note that a state represented by a latent representation is different from a real state of a working environment unless the encoder 315 is trained with 100% accuracy. The action A1 (340) can be determined for the first image using a reinforcement learning algorithm or a control policy in a reinforcement learning algorithm. In some implementations, the action A1 (340) is determined based on the predicted first latent representation Z1 (320) for the first image. The predicted reward Rp (345) is provided as an input to the loss engine 355, which is equivalent to the loss engine 155 of FIG. 1.

In addition, the reward prediction neural network 325 has been pre-trained on tasks relevant or equivalent to the tasks performed by the working environment captured by the image pair. Accordingly, the predicted reward Rp (345) is determined by the reward prediction neural network 325 is customized for the particular robotic task captured in the image pair, which enhances the accuracy of training the autoencoder. In some implementations, the reward prediction neural network 325 can be fine-tuned based on the input image pairs to improve the accuracy of the predicted reward for the robot's action in a state corresponding to the first image of the image pair.

The dynamics prediction neural network 330 is configured to predict the next latent representation Zp (350) for a next state to which the working environment transforms after one or more robots perform the action A1 (340).

Similar to the reward prediction neural network 325, the dynamics prediction neural network 330 has also been pre-trained. In general, the action A1 (340) generally connects working environment states in the first image and the second image of the image pair. In other words, the action A1 (340) is determined such that after robots perform action A1 (340) when the working environment is in the first state, the working environment state would transform from the first state captured in the first image to a next state that is equivalent to the second state captured in the second image, theoretically if the encoder 315 is trained to generate latent representations with 100% accuracy. Again, please note that the predicted next latent representation Zp (350) for the next time step is determined according to the first latent representation Z1 (320) predicted by the encoder 315, not the real latent representation for the first image. The predicted next latent representation Zp (350) is provided to the loss engine 355.

As described above, the loss engine 355 can determine an objective for training the encoder 315. More specifically, for each pair of image pairs, the loss engine is configured to update model parameters of the encoder 315 to reduce an overall loss for the image pair. The overall loss includes two respective losses, e.g., a reward prediction loss and a latent representation prediction loss. To generate the reward prediction loss, the loss engine 355 can determine a reward prediction loss function that compares a difference between the predicted reward Rp (345) and a reference reward R (360) for performing action 340 in the state captured by the first image. One example reward prediction loss function can be expressed as follows:

$$Loss_r = MSE(Rp \| R), \quad \text{Equation (4)}$$

wherein the $Loss_r$ is the mean square error between the predicted reward and the reference reward for the first image.

In addition, to further improve the training accuracy, the system can reshape the predicted reward to construct a dense reward. More specifically, the system can reshape the predicted reward according to a geometric measure between states at a current time step and at the end time step in a reward episode. Such a geometric measure can include any suitable metrics. The geometric measure can be formulated in a linear form, and assuming that "St" refers to as the current state at the current time step in a reward episode, and "Sg" refers to the target state in the reward episode (or equivalently, a goal state that the working environment would want to reach at the end of the episode), one example formula can be expressed as Rt=−[F(St)−F(Sg)], where the function F(S) measures a reward accumulated at a current state S. The function F( ) can be formulated based on a L2 norm. Note that the states "St" and "Sg" for reshaping the reward functions generally include data that is a subset of the working environment states captured in image pairs. For example the states "St" and "Sg" can include data representing poses and orientations of robots and objects in the working environment, whereas the working environment states can include additional information such as the background information.

The loss engine 244 can determine a latent representation prediction loss function that compares a difference between the predicted next latent representation Zp 350 for the first image with the second latent representation Z2 (375) for the second image of the image pair. One example latent representation prediction loss function can be expressed as follows:

$$Loss_s = D_{KL}(z_p \| z_2), \quad \text{Equation (5)}$$

where the function $D_{KL}(x)$ refers to the DL divergence between the predicted next latent representation 350 and the second latent representation 375.

The overall loss function can include a weighted combination of the reward prediction loss function and the latent representation prediction loss function. For example, the overall loss function can be express as follows:

$$Loss = Loss_r + Loss_s. \quad \text{Equation (6)}$$

Figure 4:
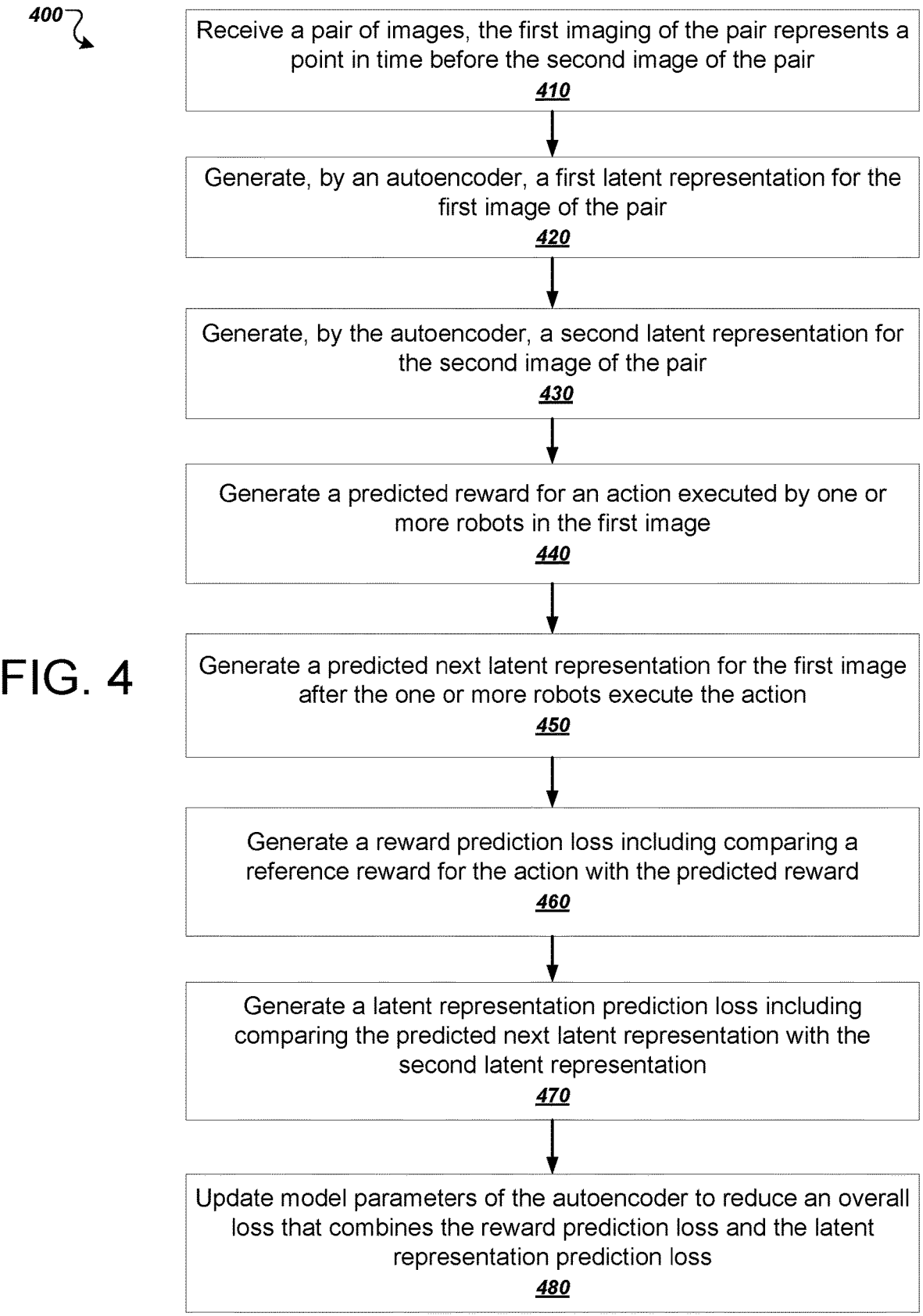
FIG. 4 illustrates an example process of training an autoencoder.

FIG. 4 illustrates an example process 400 of training an autoencoder. For convenience, the process can be performed by a system of one or more computers located in one or more locations. For example, a system 100 of FIG. 1, appropriately programmed, can perform the process 400. The system generally trains an autoencoder to generate latent representations for working environment states captured in images.

The system first receives a pair of images representing a working environment (410). The working environment includes one or more robots and one or more objects to be manipulated by the one or more robots to perform a task. The working environment, for example, can be equivalent to the workcell 170 of FIG. 1. Each pair of image pairs can include a first image and a second image. Both the first image and the second image captures the common working environment but at different time steps. For example, the first image of the pair represents a first state of the working environment at a first time step, and the second image of the pair represents a second state of the working environment at a second time step after the first time step. The first state and the second state of the working environment are generally different from each other. However, in some implementations, the two states at different time steps can be substantially similar.

The system generates a first latent representation for the first state of the working environment in the first image by the autoencoder processing the first image (420). The autoencoder to be trained includes at least an encoder stack having multiple neural network layers configured to process the input image to generate a latent representation for the input image. The determination process can include sampling a latent representation based on a posterior distribution, as described above. In addition, the autoencoder under training includes an encoder configured to generate latent representations for input images, and the autoencoder does not include a decoder configured to reconstruct the input images using the predicted latent representations. Accordingly, the reconstruction loss is not included for consideration when training the autoencoder.

The system generates a second latent representation for the second state of the working environment in the second image by the autoencoder processing the second image (430). The process is similar to that in step 420, but the input is not the second image of an image pair capturing a working environment at a second time step.

The system generates, by a reward prediction neural network, a predicted reward for an action after the robot executes the action in a working environment state corresponding to the first state of the working environment (440). As described above, the reward prediction neural network has been trained to be task-specific, i.e., trained for one or more robotic tasks similar or equivalent to the task captured in the image pairs of the training samples. In addition, note that the predicted reward for the action is determined after the action is executed by robots in a state that corresponds to the first state of the working environment. This is because the reward prediction neural network receives the first latent representation from the autoencoder as an input, and the action is accordingly performed in a state represented by the first latent representation. Theoretically, the state represented by the first latent representation should be equivalent to the real state of the working environment if the autoencoder is trained to predict latent representation with absolute accuracy. In some implementations, the action to be performed by the robots can be determined based on the first latent representation predicted for the first image by the autoencoder.

The system generates, by a dynamics prediction neural network, a predicted next latent representation after the robot completes the action (450). The predicted next latent representation represents a new working environment state that corresponds to the second state of the working environment. And the action for the robot should correlate the working environment in the first image and the second image of the image pair: the working environment should shift from the first working environment state to the second working environment state after one or more robots perform the action. However, since the predicted next latent representation is generated based on the predicted first latent representation for the first image, the predicted next latent representation generally does not represent the real second state of the working environment captured by the second image unless the autoencoder has been trained to predict latent representations with no error.

The system generates a reward prediction loss including comparing a reference reward for the action with the predicted reward (460). The reward prediction loss is determined by a reward prediction loss function using a loss engine (e.g., loss engine 155 of FIG. 1). The reward prediction loss function measures a difference between the reference reward for the action and the predicted reward based on the action and the predicted first latent representation for the first image. The difference can be formulated as a mean squared error between the predicted reward and the reference reward.

The system can further reshape the sparse reward to a dense form, which improves the accuracy of training the autoencoder. The details of reshaping a sparse reward based on geometric measure of time steps in a reward episode are described in greater details above.

The system generates a latent representation loss including comparing the predicted next latent representation with the second latent representation (470). The latent representation loss is determined by a latent representation prediction loss function using the loss engine. The latent representation prediction loss function measures a difference between the predicted next latent representation for the first image of an image pair and the second latent representation for the second image of the image pair. More specifically, the difference can include a KL divergence between the distribution of the predicted next latent representation and the distribution of the second latent representation.

The system updates model parameters of the autoencoder to reduce an overall loss that combines the reward prediction loss and the latent representation loss (480). The overall loss can be a weighted sum of the reward prediction loss and the latent representation prediction loss for the image pair, as described above. The update process can be performed using various suitable backward propagation techniques (e.g., stochastic gradient descent) with different optimizers (e.g., the Adam optimizer).

Furthermore, the trained autoencoder can be used for training a reinforcement learning model to control robots in a working environment for performing one or more tasks. More specifically, the system can generate respective latent representations for input images capturing different states of a working environment, and use the respective latent representations as training samples to train a reinforcement learning model for controlling robots in the working environment. In some implementations, the system can further fine-tune the trained autoencoder when training the reinforcement learning model.

The system repeatedly performs the operations of steps 410-480 for each image pair of multiple image pairs in the training samples. The training samples can be generated by the system moving or manipulating one or more robots in the working environment for respective initial states at a first time step to respective states at a second time step.

In this specification, a robot is a machine having a base position, one or more movable components, and a kinematic model that can be used to map desired positions, poses, or both in one coordinate system, e.g., Cartesian coordinates or joint angles, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by a data processing apparatus, cause the apparatus to perform those operations or actions. That special-purpose logic circuitry is configured to perform particular operations or actions means that the circuitry has electronic logic that performs those operations or actions.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it, software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method of training an autoencoder to generate latent representations for working environment states captured in images, the method comprising: receiving a pair of images representing a working environment that includes at least (i) a robot and (ii) an object manipulated by the robot, wherein a first image of the pair represents a first state of the working environment at a first time step, and a second image of the pair represents a second state of the working environment at a second time step after the first time step; generating, by the autoencoder processing the first image, a first latent representation for the first state of the working environment in the first image; generating, by the autoencoder processing the second image, a second latent representation for the second state of the working environment in the second image; generating, by a reward prediction neural network, a predicted reward for an action if the robot in the working environment executes the action at the first state of the working environment; generating, by a dynamics prediction neural network, a predicted next latent representation after the robot completes the action, wherein the predicted next latent representation represents a new working environment state that corresponds to the second state of the working environment; generating a reward prediction loss including comparing a reference reward for the action with the predicted reward; generating a latent representation loss including comparing the predicted next latent representation with the second latent representation; and updating model parameters of the autoencoder to reduce an overall loss that combines the reward prediction loss and the latent representation loss.

Embodiment 2 is the method of Embodiment 1, wherein generating the predicted reward further comprises reshaping the reward prediction based on geometric measure of time steps in a reward episode.

Embodiment 3 is the method of Embodiment 1 or 2, wherein the reward prediction loss comprises a mean squared loss between the predicted reward and the reference reward.

Embodiment 4 is the method of any one of the Embodiments 1 to 3, where in the latent representation loss comprises a KL divergence between the predicted next latent representation and the second latent representation.

Embodiment 5 is the method of any one of the Embodiments 1 to 4, further comprising: after the autoencoder has been trained, generating, by the autoencoder, respective latent representations for working environment states captured in input images, and training a reinforcement learning model based on the generated respective latent representations.

Embodiment 6 is the method of any one of the Embodiments 1 to 5, wherein training the autoencoder comprises training an encoder included in the autoencoder, wherein the encoder is configured to generate a latent representation for an input image.

Embodiment 7 is the method of any one of the Embodiments 1 to 6, wherein the training comprises performing the operations of claim 1 with respective pairs of images for a second time, wherein the respective pairs of images are generated by moving the robot from a respective initial state at a first time step to a different state at a second time step.

Embodiment 8 is a system comprising one or more computers and one or more storage devices storing instructions that are operable, when executed by the one or more computers, to cause the one or more computers to perform the method of any one of embodiments 1-7.

Embodiment 9 is a computer storage medium encoded with a computer program, the program comprising instructions that are operable, when executed by data processing apparatus, to cause the data processing apparatus to perform the method of any one of embodiments 1-7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A method of training an autoencoder to generate latent representations for working environment states captured in images, the method comprising:
   receiving a pair of images representing a working environment that includes at least (i) a robot and (ii) an object manipulated by the robot, wherein a first image of the pair represents a first state of the working environment at a first time step, and a second image of the pair represents a second state of the working environment at a second time step after the first time step;
   generating, by the autoencoder processing the first image, a first latent representation for the first state of the working environment in the first image;
   generating, by the autoencoder processing the second image, a second latent representation for the second state of the working environment in the second image;
   generating, by a reward prediction neural network, a predicted reward for an action if the robot in the working environment executes the action at the first state of the working environment;

generating, by a dynamics prediction neural network, a predicted next latent representation after the robot completes the action, wherein the predicted next latent representation represents a new working environment state that corresponds to the second state of the working environment;

generating a reward prediction loss including comparing a reference reward for the action with the predicted reward;

generating a latent representation loss including comparing the predicted next latent representation with the second latent representation; and updating model parameters of the autoencoder to reduce an overall loss that combines the reward prediction loss and the latent representation loss.

2. The method of claim 1, wherein generating the predicted reward further comprises reshaping the reward prediction based on geometric measure of time steps in a reward episode.

3. The method of claim 1, wherein the reward prediction loss comprises a mean squared loss between the predicted reward and the reference reward.

4. The method of claim 1, where in the latent representation loss comprises a Kullback-Leibler (KL) divergence between the predicted next latent representation and the second latent representation.

5. The method of claim 1, further comprising: after the autoencoder has been trained,
generating, by the autoencoder, respective latent representations for working environment states captured in input images, and
training a reinforcement learning model based on the generated respective latent representations.

6. The method of claim 1, wherein training the autoencoder comprises training an encoder included in the autoencoder, wherein the encoder is configured to generate a latent representation for an input image.

7. The method of claim 1, wherein the training comprises performing the method of claim 1 with respective pairs of images for a second time, wherein the respective pairs of images are generated by moving the robot from a respective initial state at a first time step to a different state at a second time step.

8. A system comprising one or more computers and one or more storage devices storing instructions that are operable, when executed by the one or more computers, to cause the one or more computers to perform operations of training an autoencoder to generate latent representations for working environment states captured in images, the operations comprising:
receiving a pair of images representing a working environment that includes at least (i) a robot and (ii) an object manipulated by the robot, wherein a first image of the pair represents a first state of the working environment at a first time step, and a second image of the pair represents a second state of the working environment at a second time step after the first time step;
generating, by the autoencoder processing the first image, a first latent representation for the first state of the working environment in the first image;
generating, by the autoencoder processing the second image, a second latent representation for the second state of the working environment in the second image;
generating, by a reward prediction neural network, a predicted reward for an action if the robot in the working environment executes the action at the first state of the working environment;
generating, by a dynamics prediction neural network, a predicted next latent representation after the robot completes the action, wherein the predicted next latent representation represents a new working environment state that corresponds to the second state of the working environment;
generating a reward prediction loss including comparing a reference reward for the action with the predicted reward;
generating a latent representation loss including comparing the predicted next latent representation with the second latent representation; and
updating model parameters of the autoencoder to reduce an overall loss that combines the reward prediction loss and the latent representation loss.

9. The system of claim 8, wherein generating the reward prediction further comprises reshaping the reward prediction based on geometric measure of time steps in a reward episode.

10. The system of claim 8, wherein the reward prediction loss comprises a mean squared loss between the predicted reward and the reference reward.

11. The system of claim 8, where in the latent representation loss comprises a Kullback-Leibler (KL) divergence between the predicted next latent representation and the second latent representation.

12. The system of claim 8, wherein the operations further comprise: after training the autoencoder,
generating, by the autoencoder, respective latent representations for working environment states captured in input images, and
training a reinforcement learning model based on the generated respective latent representations.

13. The system of claim 8, wherein training the autoencoder comprises training an encoder included in the autoencoder, wherein the encoder is configured to generate a latent representation for an input image.

14. The system of claim 8, wherein the training comprises performing the operations of claim 1 with respective pairs of images for a second time, wherein the respective pairs of images are generated by moving the robot from a respective initial state at a first time step to a different state at a second time step.

15. A non-transitory computer storage medium encoded with a computer program, the program comprising instructions that are operable, when executed by data processing apparatus, to cause the data processing apparatus to perform operations of training an autoencoder to generate latent representations for working environment states captured in images, the operations comprising:
receiving a pair of images representing a working environment that includes at least (i) a robot and (ii) an object manipulated by the robot, wherein a first image of the pair represents a first state of the working environment at a first time step, and a second image of the pair represents a second state of the working environment at a second time step after the first time step;
generating, by the autoencoder processing the first image, a first latent representation for the first state of the working environment in the first image;
generating, by the autoencoder processing the second image, a second latent representation for the second state of the working environment in the second image;

generating, by a reward prediction neural network, a predicted reward for an action if the robot in the working environment executes the action at the first state of the working environment;

generating, by a dynamics prediction neural network, a predicted next latent representation after the robot completes the action, wherein the predicted next latent representation represents a new working environment state that corresponds to the second state of the working environment;

generating a reward prediction loss including comparing a reference reward for the action with the predicted reward;

generating a latent representation loss including comparing the predicted next latent representation with the second latent representation; and updating model parameters of the autoencoder to reduce an overall loss that combines the reward prediction loss and the latent representation loss.

16. The non-transitory computer storage medium of claim 15, wherein generating the reward prediction further comprises reshaping the reward prediction based on geometric measure of time steps in a reward episode.

17. The non-transitory computer storage medium of claim 15, wherein the reward prediction loss comprises a mean squared loss between the predicted reward and the reference reward.

18. The non-transitory computer storage medium of claim 15, where in the latent representation loss comprises a Kullback-Leibler (KL) divergence between the predicted next latent representation and the second latent representation.

19. The non-transitory computer storage medium of claim 15, wherein the operations further comprise: after the autoencoder has been trained,
    generating, by the autoencoder, respective latent representations for working environment states captured in input images, and
    training a reinforcement learning model based on the generated respective latent representations.

20. The non-transitory computer storage medium of claim 15, wherein training the autoencoder comprises training an encoder included in the autoencoder, wherein the encoder is configured to generate a latent representation for an input image.

* * * * *